(12) United States Patent
Andersson et al.

(10) Patent No.: US 9,732,782 B2
(45) Date of Patent: Aug. 15, 2017

(54) LOCKING WASHER ASSEMBLY (71) Applicant: NORD-LOCK AB, Mattmar (SE)

(72) Inventors: Mattias Andersson, Östersund (SE); Catarina Henriksson, Östersund (SE)

(73) Assignee: NORD-LOCK AB, Mattmar (SE)

( * ) Notice: Subject to any disclaimer, the term of this patent is extended or adjusted under 35 U.S.C. 154(b) by 41 days.

(21) Appl. No.: 14/771,470

(22) PCT Filed: Feb. 28, 2014

(86) PCT No.: PCT/SE2014/050246
§ 371 (c)(1),
(2) Date: Aug. 28, 2015

(87) PCT Pub. No.: WO2014/133446
PCT Pub. Date: Sep. 4, 2014

(65) Prior Publication Data
US 2016/0003287 A1    Jan. 7, 2016

(30) Foreign Application Priority Data
Feb. 28, 2013   (SE) ................... 1350242-2

(51) Int. Cl.
*F16B 39/24* (2006.01)
*F16B 39/282* (2006.01)
*F16B 43/00* (2006.01)

(52) U.S. Cl.
CPC ............ *F16B 39/24* (2013.01); *F16B 39/282* (2013.01); *F16B 43/00* (2013.01)

(58) Field of Classification Search
CPC ........... F16B 39/24; F16B 39/82; F16B 43/00
(Continued)

(56) References Cited

U.S. PATENT DOCUMENTS 5,203,656 A * 4/1993 McKinlay ............ F16B 39/282
411/149
5,688,091 A * 11/1997 McKinlay ............ F16B 39/282
411/136
(Continued)

FOREIGN PATENT DOCUMENTS

CN         2101133 U     4/1992
CN       101460662 A     6/2009
(Continued)

OTHER PUBLICATIONS

Office Action dated Aug. 1, 2016 of corresponding Chinese Patent Application No. 201480010691.1 and its English translation—12 pages.

(Continued)

*Primary Examiner* — Gary Estremsky
(74) *Attorney, Agent, or Firm* — Knobbe Martens Olson & Bear LLP (57) ABSTRACT

A locking washer assembly includes a first locking washer and a second locking washer. The first and second locking washers include a mechanism for engaging an element to be attached by means of a screw joint. The first and second locking washers include a mechanism for engaging each other. The first locking washer includes a central through hole that is larger than a central hole of the second locking washer. An attachment assembly includes a screw intended to be used with the locking washer assembly.

6 Claims, 5 Drawing Sheets (58) Field of Classification Search
USPC .................................................. 411/149, 531
See application file for complete search history.

(56) References Cited

U.S. PATENT DOCUMENTS

| | | | |
|---|---|---|---|
| 6,966,735 B1* | 11/2005 | Yamazaki | ............... F16B 39/24 411/131 |
| 2004/0131443 A1 | 7/2004 | Terry | |
| 2007/0110542 A1* | 5/2007 | Weimann | ............... F16B 39/24 411/145 |
| 2010/0239390 A1 | 9/2010 | Junkers | |

FOREIGN PATENT DOCUMENTS

| | | |
|---|---|---|
| CN | 101506535 A | 8/2009 |
| GB | 792215 A | 3/1958 |
| GB | 1109240 A | 4/1968 |
| SE | 532106 C2 | 3/2008 |
| WO | 2004/033139 A2 | 4/2004 |

OTHER PUBLICATIONS

International Search Report from PCT Application No. PCT/SE2014/050246 in 4 pages.
European Search Report dated Aug. 30, 2016 of corresponding European Application No. 14756437.1—6 pages.

\* cited by examiner

- PRIOR ART -

Figure 1

- PRIOR ART -

Figure 1A

- PRIOR ART -

Figure 2

- PRIOR ART -

LOCKING WASHER ASSEMBLY

CROSS-REFERENCE TO RELATED APPLICATIONS

This application is a national phase application under 35 U.S.C. §371 of the international application PCT/SE2014/050246, filed Feb. 28, 2014, which claims priority to Sweden Patent Application No. SE 1350242-2, filed Feb. 28, 2013, the entire contents of all of which are hereby incorporated by reference herein.

TECHNICAL FIELD OF THE INVENTION

The present invention relates to the technical area of a locking washer assembly. The invention also relates to an attachment assembly.

BACKGROUND

Washers for locking purposes are previously known and normally comprise a central hole for a screw shank. Generally there are many different variants of this arrangement. One particular arrangement is a locking washer comprising teeth on one side and cams on the other side. The teeth can in general be described as being, of a shape that enables them to engage with a surface of a screw head, nut or an element to be attached. One possible shape is a leaning pyramidal shape. The teeth extend radially on the locking washer surface. The other side of the known lock washers can have a cam pattern. The cam pattern in general can be described as a sloped wedge surface where the inclination angle of the cams should be larger than the pitch of the thread of the screw. The cam pattern extends radially. These locking washers are used in pairs where the pair is constituted of two equal washers, however applied such that the cams is adjacent each other and the teeth of the corresponding other side of the washers are facing away from each others. Applied in a correct manner and with the proper hardness of the elements to be attached and the washers to lock the screw joint, this configuration provides for a very safe and reliable attachment. Washers of this type is for example described in the document DE 2 413 760.

In another document US 2008/0014046 A1 is also a washer described that is intended to be used in pairs.

SHORT DESCRIPTION OF THE INVENTION

The invention relates to a locking washer assembly. It also relates to an attachment assembly.

In general the inside diameter of locking washers used in pairs is adapted to the geometry of the screw head. In particular clearance is given for the radius under the bolt head. Washers for screws with a large diameter are combined with a chamfered edge to the inner diameter. It has been noted that the washer inner diameter and radius or chamfer under the screw heads affects the ratio between torque and claim load in the joint and the stress distribution in the screw joint, the amount of settlements in the joint after tightening and tensions in the washer. High radially directed forces can lead to cracks in the washer. And further also when adapting the inner diameter of the locking washers to the radius under the bolt head cases the washers in adverse conditions to misalign against the male threaded shank section of a screw when not mounted against a screw head. This miss alignment will affect the torque tension ratio and might cause misalignments between the pair of washers jeopardizing the wedge locking function. And further if the through hole of the pair of locking washers is too small, problems with cutting into the said radius of a screw head can occur. Then the ratio between the torque and the clamp load is affected. This will lead to a loss of pretension of the screw joint, i.e. with the same tightening torque a loss of pretension will occur. Torque will basically be consumed by machining the screw instead of creating pretension in the screw joint. Thus a risk of fatigue of the joint is increased.

In order to solve at least one of the above mentioned problems the solution is proposed:

A locking washer assembly comprising a first locking washer and a second locking washer, wherein the first and second locking washer comprise means for engaging an element to be attached by means of a screw joint and further said first and second locking washer comprise means for engaging each other, wherein the first locking washer comprises a central through hole that is larger than the central hole of the second locking washer.

The effect of this is that the locking washer assembly can firmly engage with the screw that they are applied to without risking dislocation in the transversal direction. The risk of cracking is also diminished and as the first washer can be positioned adjacent the lower surface of the screw head. And fatigue of the screw joint due to machining of the screw is prevented, and at the same time a guiding can be achieved of the locking washer assembly by the second locking washer to the screw shank.

In a further development it is proposed a locking washer assembly according to the above wherein the central through hole of the first locking washer is arranged with a diameter that allows for the first locking washer to be movable laterally when engaged on a screw shank that the first locking washer is intended to be applied on, such that the first locking washer can be moved such that it is visibly laterally off centre.

The effect off this is that the locking washer assembly can be easily fit to a shank of a screw. And further this allows for the first locking washer to fit over the radius or chamfer of the screw at the transition between the screw head and the screw shank. This also prevents further the possibility of having problem with the first washer cutting, or machining into a screw head having a radius. Thus avoids the risk of fatigue and loss of pretension of the screw joint.

In a further development it is proposed a locking washer assembly according to the above, wherein the central hole of the second locking washer has a size that essentially corresponds to the diameter of a screw shank that it is intended to be applied to.

The effect of this is that the locking washer assembly is prevented from lateral movement in an efficient way. This also provides for a correct guidance of the locking washer assembly by means of the interaction between the second locking washer and the screw shank.

In a further development it is proposed a locking washer assembly according to the above, wherein the first locking washer has a diameter of the central through hole that allows the first locking washer's teeth to engage with a surface of a screw head that is provided with a chamfer or a radius in the transition between the head of the screw and the shank of the screw, wherein this engagement is possible when the first locking washer is pushed up against a head of such a screw comprising a chamfer or a radius in the transition between the head of the screw and the shank of the screw.

This has the effect that the locking function of the locking washer assembly is improved. This means that the surface on which the teeth of the first locking washer can engage is optimized as the surface is the largest possible.

In a further development it is proposed a locking washer assembly according to the above, wherein said second locking washer has a diameter of the central through hole that prevents the teeth of the second locking washer to engage with a screw head that has a chamfer or radius in the transition between the screw head and the shank of a screw that it is intended to be used with.

This has the effect that the second locking washer is not as easy to mix with the first locking washer, thus improving the safety of applying the locking washer assembly by the user, such that not the wrong locking washer is applied in the wrong direction on a screw shank.

In a further development it is proposed a locking washer assembly according to the above wherein the first locking washer and the second locking washer are preassembled into a locking washer unit.

This has the effect that a user can handle the locking washer assembly easily without risking loosing any locking washer in the process. It is also an advantage for the applying to a screw shank as the washers have different diameter this process can be more difficult than with a standard locking washer pair.

In a further development it is proposed a locking washer assembly according to the above wherein the first and the second locking washers are preassembled by means of a glue.

This is an advantageous way of assembly the first and the second locking washer in particular because they can be detached from each other and afterwards reattached again.

In a further development it is propose a locking washer assembly according to the above, wherein said means for engaging the element to be attached is in the form of radially extending teeth.

This is a convenient and advantageous way of designing the engagement means.

In a further development it is proposed a locking washer assembly according to the above, wherein said means for engaging the first and the second locking washer to each other is in the form of radially extending cams.

This is a convenient and advantageous way of designing the engagement means.

In a further development it is proposed a locking washer assembly according to the above, wherein the first and the second locking washers are of the cam locking type.

In a further development it is proposed a locking washer assembly according the above, wherein said cams has an inclination angle α that is adapted to the be larger than the corresponding pitch angle β for a thread of a screw it is intended to be used with.

This is a preferred way of achieving the locking function of the locking washer assembly.

In a further development it is proposed a locking washer assembly according to the above, wherein the first locking washer has a chamfer at the central through hole border.

This provides for an even more tight engagement of the first locking washer with the screw's head.

In a further development it is proposed a locking washer assembly according to the above wherein the first locking washer has a chamfer with an diameter of the border at the cam side of the locking washer that is essentially the same as the through hole of the second locking washer, such that the first locking washer cannot be moved visibly laterally off centre when applied to of a screw shank that it is intended to be used with.

This further improves the stability of the locking washer assembly in particular in the lateral direction when applied to an intended screw shank.

It is also proposed an attachment assembly comprising a screw intended to be used with a locking washer assembly according to any of the above.

The advantage of this is that a user is always using the right locking washer assembly with an intended screw, such that for example the locking washer assembly is not applied to a screw with a too thin shank, where the stability in particular in lateral direction is not jeopardized.

DETAILED DESCRIPTION

Figure 1:
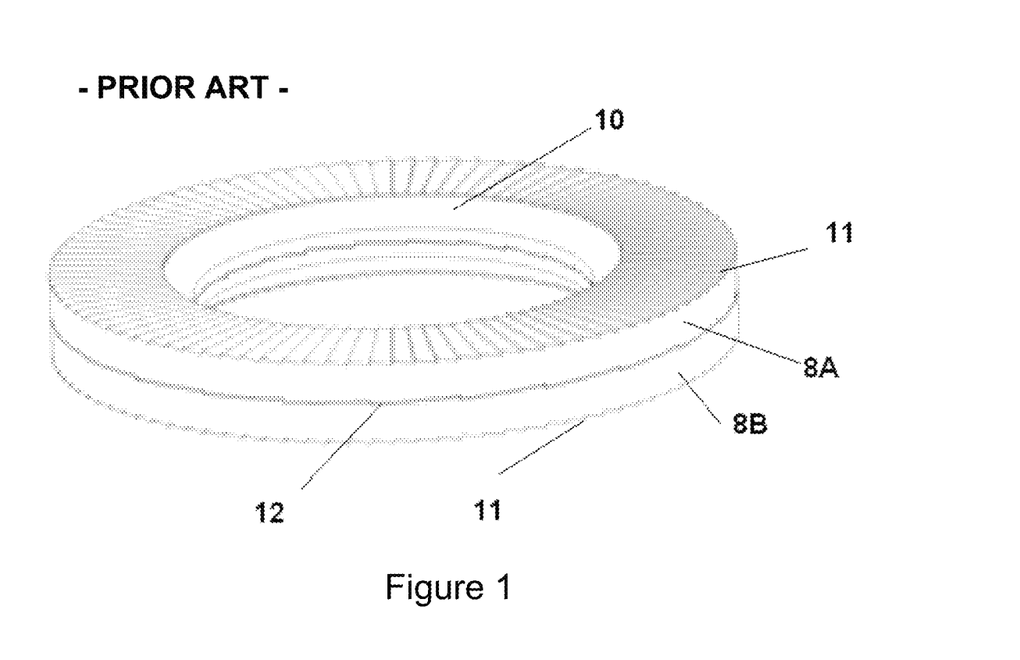
FIG. 1 Discloses prior art locking washers in a pair.
Figure 1A:
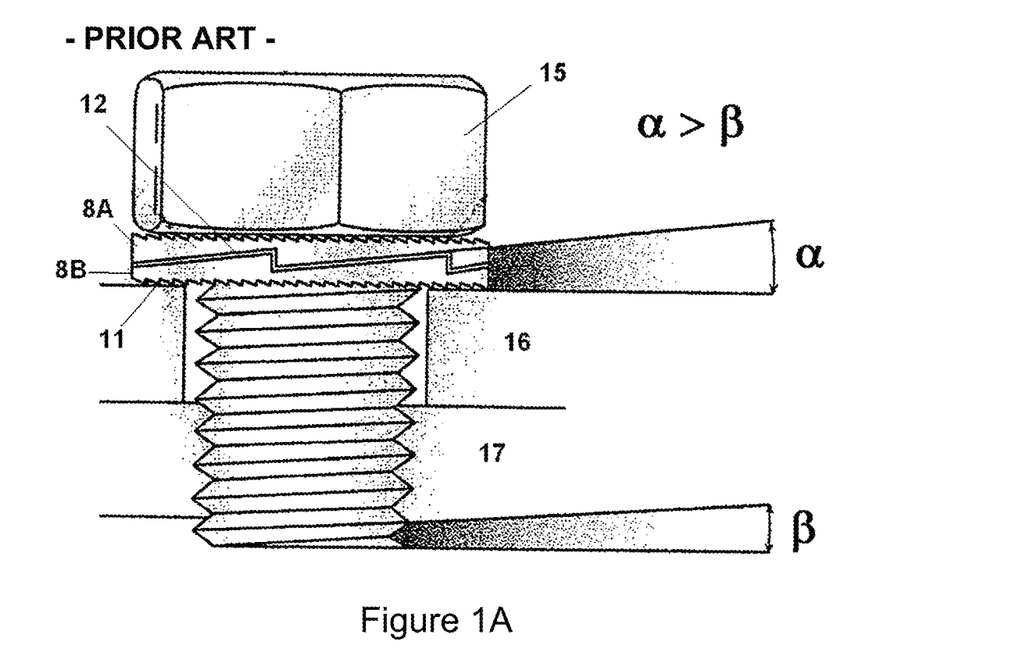
FIG. 1a Discloses prior art locking washers and a screw locked by these.
Figure 2:
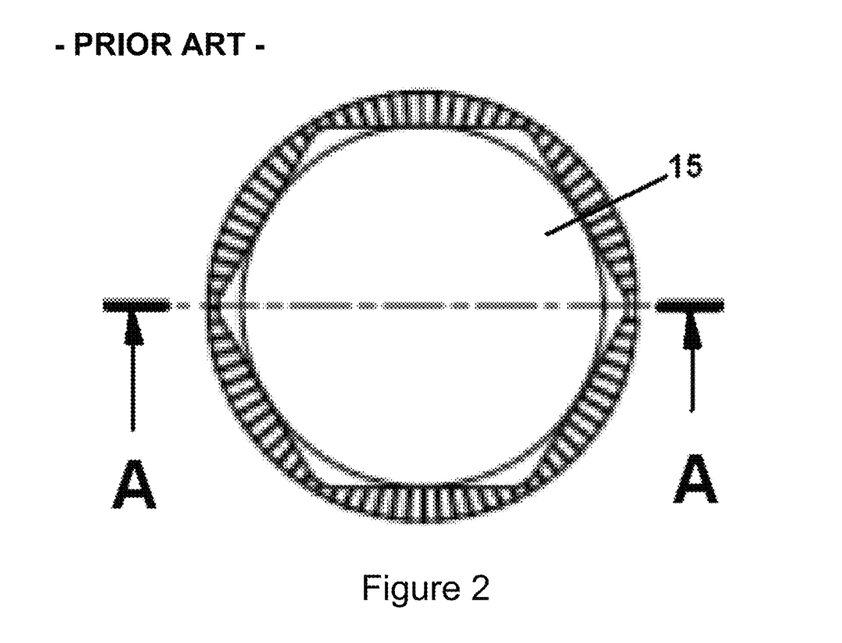
FIG. 2 Discloses a screw with locking washers from above.
Figure 3:
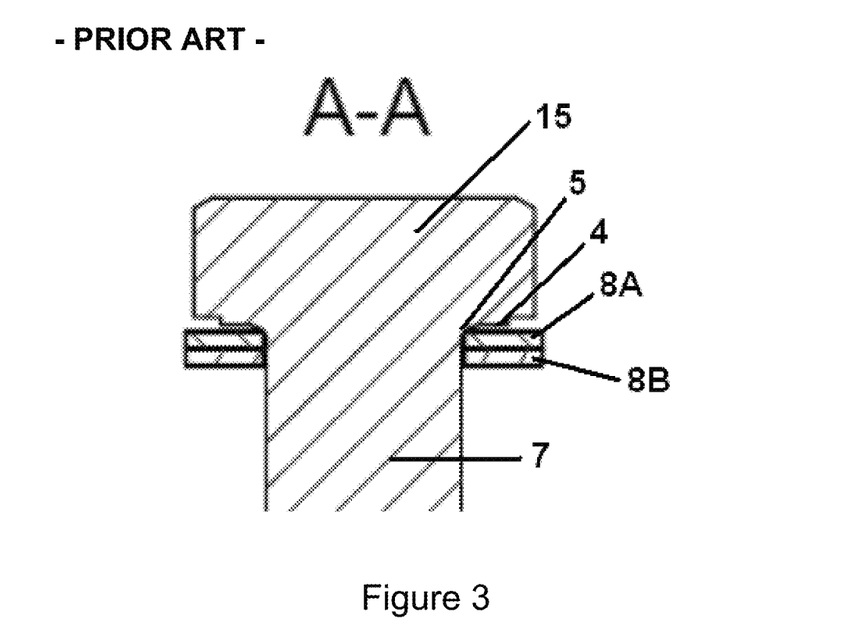
FIG. 3 Discloses a section of a screw with a pair of locking washers according section A-A of FIG. 2.

FIGS. 1-3 discloses prior art of locking washers 8A, 8B used in pair. The locking washers general comprises engagement means in the form of teeth 11 on one side and engagement means in the form of cams 12 on the other side. The locking washers 8A, 8B are intended to be used in a pair and are always exact copies of each other. The only difference between washer 8A and 8B is that they are turned opposite to each other.

FIG. 1, discloses a prior art locking washer 8A, 8B having ha chamfer 10. This chamfer 10 has been introduced to adapt the locking washer to a screw having a radius 5 or a chamfer with two radiuses 5', 5a, 5b, see FIGS. 7 and 8, for explanation of how the screw 15 can be constituted. The washers in FIG. 1 has this constitution with chamfers 10 such that the washers 8A, 8B can fit on a screw having the radius 5 or chamfer 5' with two radiuses 5a, 5B and thus the teeth of washer 8A can be engage with the head of the screw as seen in FIG. 1a.

FIG. 1a discloses the function of the teeth 11 and the cams 12. The teeth 11 engage with the screws head and with the work piece to be attached 16. The screw 15 has a thread that engages with a threaded element 17. The pitch angle β of the thread is always smaller than the wedge angle α of the cams of the locking washers. With this configuration the screw joint is locked firmly.

The teeth 11 can have any general configuration in order to be able to engage. The shown configuration is a leaning pyramidal shape where the leaning teeth 11 engage with their steeper side to the head of the screw 15 or work piece 16. Other configurations of the teeth 11 are thinkable. For example the teeth 11 could have configuration with a homogenous pyramidal shape. The teeth 11 can also have a trapezoidal shape. It is important that the teeth 11 have a hardness that is superior the screw head and the work piece 16. The reason for this is that the teeth 11 must be able to engage with the material they are positioned adjacent, in order to achieve a locking function. Other wise the teeth could be flattened by the momentum when tightening the screw joint, or slide on a harder adjacent surface. Thus the locking washer 8A is moved with the screw 15 when tightening the screw joint and the locking washer 8B is keep still on the work piece 16.

The cams 12 can be described as wedges see FIG. 2 as an example of this. The cams 12 have the ability to lock against each other's steep surface. The respective locking washer 8A, 8B can thus when being tightened to each other have their respective cams 12 positioned adjacent each other. Locking is achieved by the wedge shape of the cams 12. When the tightened screw is being unscrewed for example by vibrations or a user, the teeth 11 of the locking washers engage with the screw's head and the element 16 that has been attached. Thus the locking washer 8A is seeking to follow the motion in the turning direction of the screw 15 and the other washer 8B is seeking to be maintained in position by its respective teeth 11 engaged with the work piece 16. The cams 12 slide on each other thus seeking to extend the screw joint in the longitudinal direction of the screw 15, by means of the inclination, wedge angle α, of the cams surface when sliding in the untightening direction. This extension locks the screw joint and prevents the screw from untightening. Thus the cams 12 prevent the locking washers 8A, 8B from being moved in the untightening direction of the screw.

The difference between teeth 11 and cams 12 can in genera be described in that the teeth are note designed to interact with another serrated surface, where as the cams 12 is intentionally intended to cooperate with each other on the respective locking washer. And the cams 12 should have a wedge angled of particular configuration as above and as seen in FIG. 1a.

Figure 4:
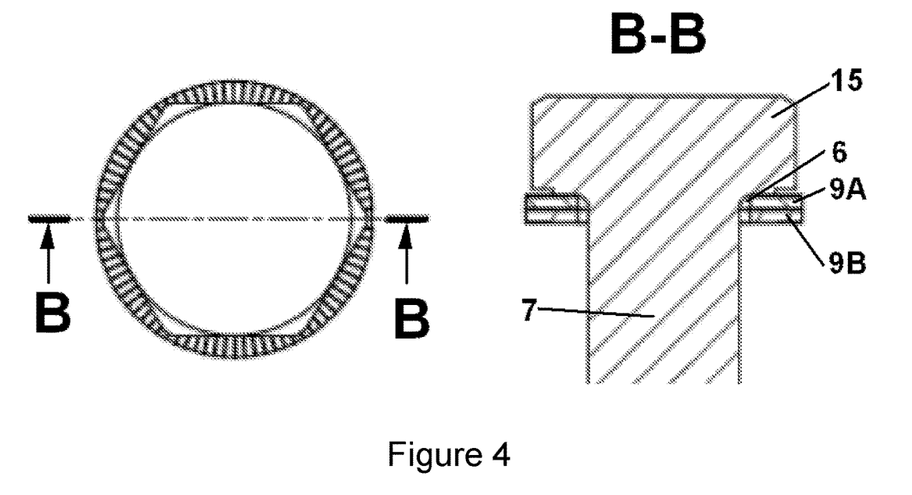
FIG. 4 Discloses a section B-B of a screw with and corresponding section of locking washers with an adapted central through hole.
Figure 5:
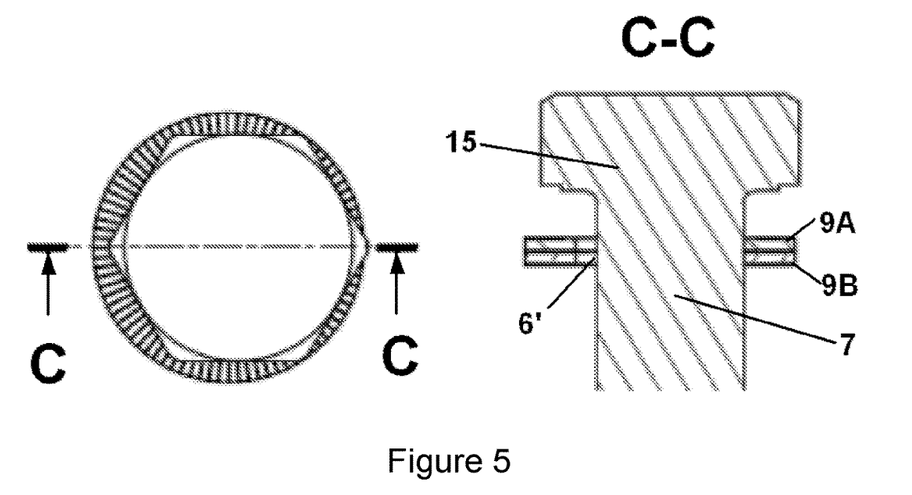
FIG. 5 Discloses the same configuration as in FIG. 4 with the locking washers on the shank of the screw in a section C-C.

In order to adapt the locking washer to a screw having a non sharp transition from the head of the screw 15 to the shank 7 of the screw the central through hole of the washers have been adapted to the washers disclosed in FIG. 4. In FIG. 3 one can see a standard configuration of locking washers 8A, 8B. And it can be seen that there is a small gap 4 between the upper serrated side of locking washer 8A and the screw head. This is due to the radius 5 that is present on the screw 15. In FIG. 4 the centre through hole has been enlarged in order for the teeth of the upper washer 9A to be able to engage with the head of the screw 15. FIG. 5 discloses the problem with this configuration of FIG. 4. The locking washer 9A and 9B has been dislocated to one side and thus the locking washers 9A, 9B is no longer centred on the screw. Thus FIGS. 3, 4 and 5 explains explicitly the problem with the prior art. Thus the locking washers 8A and 8B of FIG. 3 can crack or mal function due to the gap 4. And in FIG. 5 it is clear that the looking function of the locking washers 9A, 9B have a risk of not being centred with each other. This means that the cooperative locking of the locking washers 9A, 9B is jeopardized. The force distribution against the surface where the teeth 11 are to engage is also affected negatively, as it becomes unbalanced and more surface is provided on one lateral side of the locking washers 9A, 9B than the other side.

Figure 6:
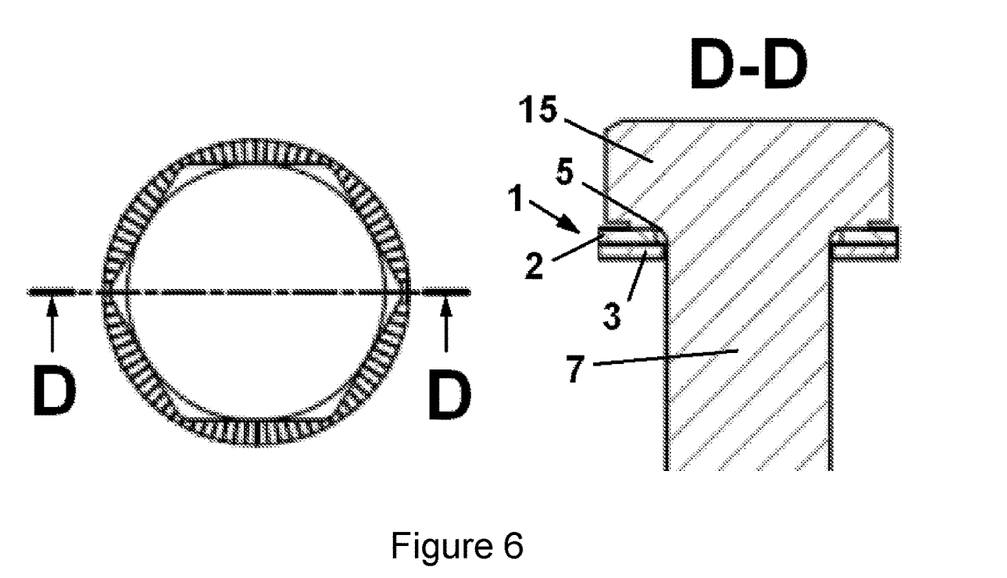
FIG. 6 Discloses a locking washer assembly according to the invention, in a section D-D.

FIG. 6 discloses a locking washer assembly 1 according to the proposed solution to remove at least some of the drawbacks of the discussed prior art. The locking washer assembly comprises a first locking washer 2 and a second locking washer 3. The first locking washer 2 is intended to be positioned adjacent the screw head of a screw 15. The screw 15 as disclosed in FIG. 6 has a radius between the head and the shank 7 of the screw.

The first locking washer 2 has a through hole that is larger than the through hole of the second locking washer 3. The through hole diameter is essentially the same as the diameter of a circle that can be described as where the radius of the screw 15 joins the flat surface of the underside of the screw 15 that begins when the radius 5 ends. This diameter of the first locking washer 2 through hole sets the minimum diameter of the through hole. A larger through hole of locking washer 2 is thinkable, but the through hole should not be extensively larger than the minimum diameter as this both will diminish the surface of teeth 11 that can engage with the surface of the screw 15. A certain contact surface of the locking washer 2 against the screw head is necessary. A too large through hole will diminish the contact surface and also there is risk of deformation of the screw's head and compression set of the screw's head. In an alternative embodiment of the locking washer 2', the through hole has a border that is chamfered according to FIG. 9. The chamfer 2'a is adapted such that the diameter of the through hole has a minimum diameter that is larger than the diameter of the through hole of the second locking washer 3. The chamfer 2'a makes the through hole border to have the constitution of a truncated cone.

The second locking washer 3 is of standard configuration in line with locking washer 8B, wherein it has a diameter of the through hole that is slightly larger than the outer diameter of the screw shank 7. Slightly in this context means that the through hole of locking washer 3 is larger than the shank 7 of the screw 15 but not so large that no guidance of the locking washer 3 to the screw shank 7 is achieved. In other words the second locking washer 3 should essentially not be able to be put of centre on the screw shank 7. The guiding of the second locking washer 3 should be understood to mean that the through hole of the diameter of the second locking washer 3 is only slightly larger than the shank of the screw shank 7, such that the washer gets guidance from the shank when introduced on this. This means that the through hole should be in the range from where it is difficult to introduce the washer on the screw shank 7 to where it runs smoothly on the shank, but still cannot be put off center, to any considerable degree. The through hole of washer 3 should preferably have a diameter that means that if the washer is introduce wrongly i.e. closest to the head of a screw 15 having a radius 5 or a camfer 5' having two radiuses 5a, 5b, the second locking washer 3 will, when being parallel, with the underside of the screw head, form a gap as seen in FIG. 3.

The locking washer assembly 1 as discussed above provides for a very good engagement of the teeth 11 of the first locking washer 2 to the screw 15. And also by the engagement of the cams 12 between the first locking washer 2 and the second locking washer 3 the first locking washer 2 is prevented from being dislocated in the lateral direction of the screw 15. Thus the second locking washer 3 holds the first locking washer 2 by means of the smaller inner diameter of the through hole 3 against the shank 7 of the screw 15.

Figure 7:
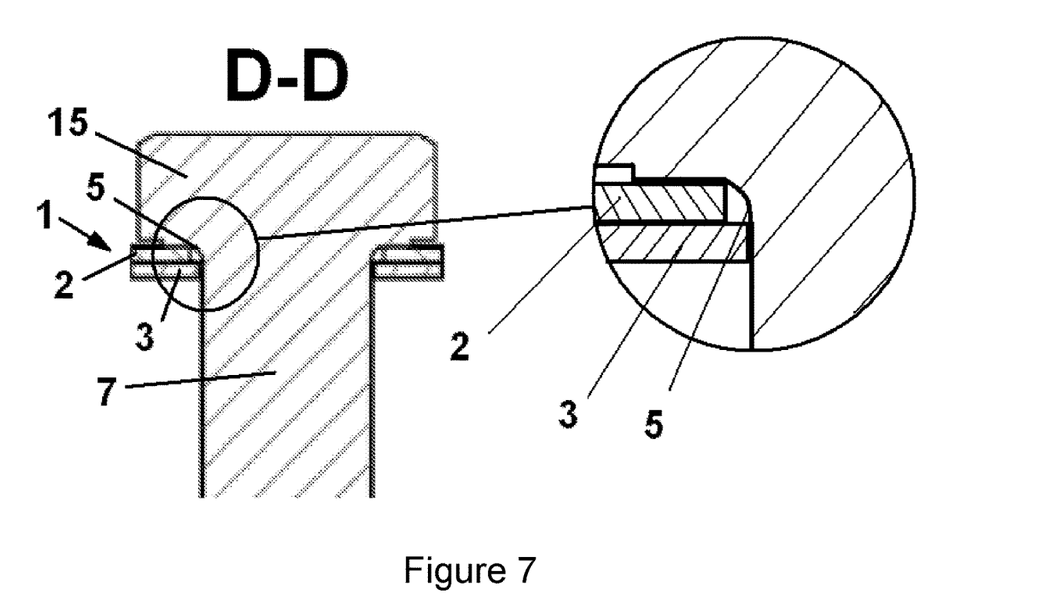
FIG. 7 Discloses a locking washer assembly according to the invention, in a section D-D.

The locking washer assembly 1 is possible to use with several different configurations of screws 15. The transition between the head of the screw 15 can have a radius 5 as shown in FIG. 7. The transition between the head of the screw 15 can also be in the form of a chamfer 5' with two radiuses 5a, 5b as seen in FIG. 8.

It is also possible, not shown in drawings, to use the locking washer assembly 1 with a screw head where the upper radius 5a ends in a notch in the screw head. This particular configuration holds the first locking washer 2 firmly in place.

Figure 8:
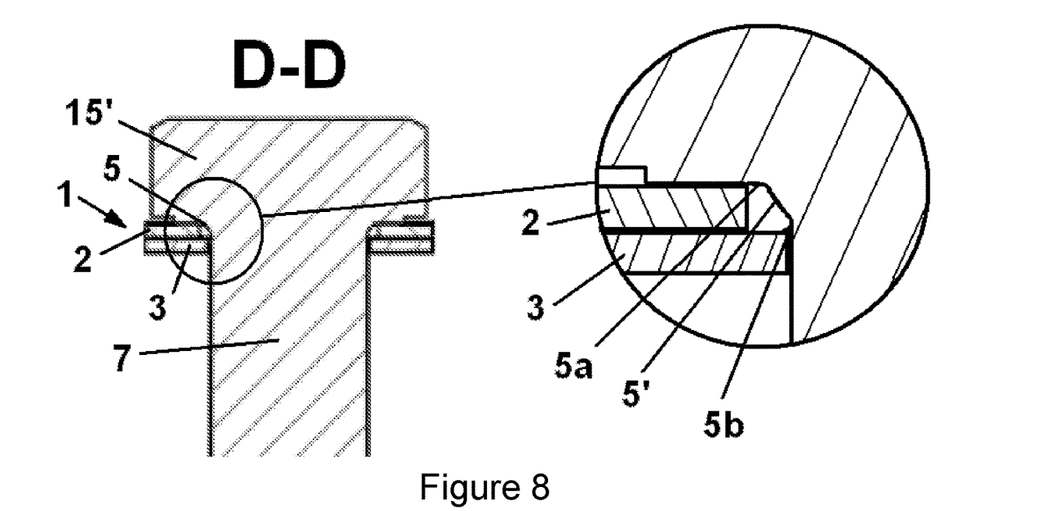
FIG. 8 Discloses a locking washer assembly according to the invention, in a section D-D.
Figure 9:
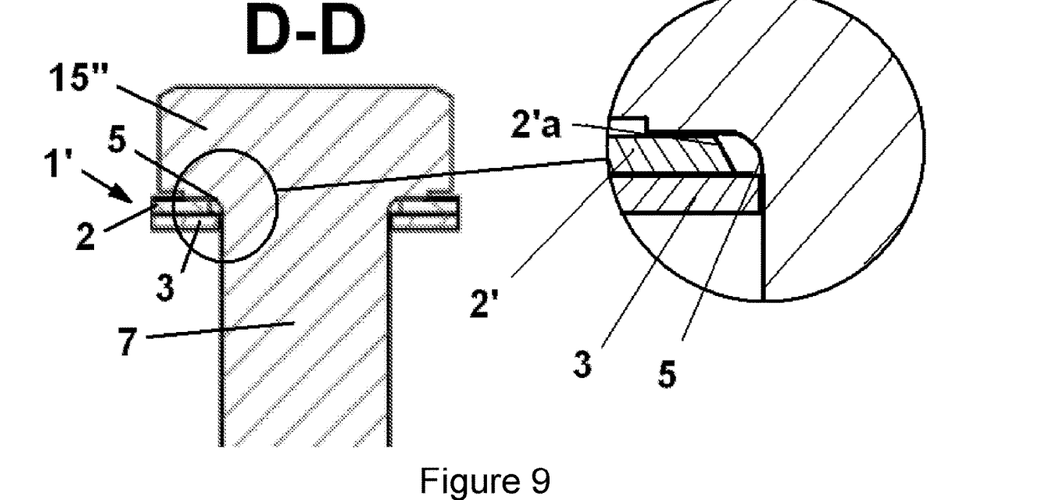
FIG. 9 Discloses an alternative embodiment of the locking washer assembly of the invention, in a section D-D.

In a particular embodiment the locking washer assembly 1' of FIG. 9 is used with a screw 15' according to FIG. 8. With a good adaptation of the first locking washers 2' upper diameter and the angle of the chamfer of the first locking washer 2' to the chamfer part of the screw" a particularly well functioning locking function is achieved, where the wedged cam surface of locking washer 2' can be made slightly larger than for a first locking washer 2 with straight inner border of the through hole.

In the above it should be understood that locking washer assembly 1 can always be replace by locking washer assembly 1'.

In a preferred configuration the first and the second locking washers 2, 2', 3 is joined to each other such that the locking washer assembly 1, 1' can be handled easily. The locking washer assembly 1; 1' is called a locking washer unit. The locking washers 2, 2', 3 are preferably joined to each other by means of a glue. The glue should allow relative movement between the first and the second locking washer 2, 2', 3. Glues that have this ability are for example various melt glues. The locking washers 2, 2' 3 should be able to be handled as an locking washer assembly 1, 1' by means of the glue.

In a preferred configuration the locking washer assembly 1, 1' is preinstalled on a screw 15, 15', and 15" into an attachment assembly. Preferably the locking washer assembly can be put onto a non threaded screw 15, 15', 15" and thereafter a thread is rolled an a part of the screw 15, 15', 15", this augmenting the diameter and preventing the locking washer assembly 1, 1' from being detached from the screw.

What is claimed is:

1. An attachment assembly comprising a screw having a non-sharp transition from a head of the screw to a shank of the screw, and a locking washer assembly comprising a first locking washer and a second locking washer,
   wherein the first and second locking washer comprise mechanism for engaging an element to be attached at a screw joint and further comprise mechanism for engaging each other,
   wherein the first and second locking washer are arranged parallel to a flat surface of the underside of the head of the screw and the first locking washer is positioned adjacent to the head of the screw wherein the first locking washer comprises a central through hole that is larger than a central through hole of the second locking washer, and wherein the diameter of the central through hole of the second locking washer is sized such that the second locking washer is prevented from engaging the head of the screw.

2. An attachment assembly according to claim 1, wherein the central through hole of the first locking washer has a diameter corresponding to the diameter of a circle that can be described as where a radius between the head of the screw and the shank of the screw joins the flat surface of the underside of the screw head that begins when the radius ends.

3. An attachment assembly according to claim 1, wherein the first and second locking washers are identical except for the diameter of their respective central through hole, and that they are turned opposite to each other.

4. An attachment assembly according to claim 1, wherein the central through hole of the second locking washer has a size that is larger than the diameter of the shank of the screw, but not larger than allowing for guidance of the second locking washer on the said shank of the screw.

5. An attachment assembly according to claim 1, wherein the mechanism for engaging the element to be attached is in the form of radially extending teeth.

6. An attachment assembly according to claim 1, wherein the mechanism for engaging the first and the second locking washer to each other is in the form of radially extending cams.

* * * * *